(12) United States Patent
Kobota (10) Patent No.: US 8,931,018 B2
(45) Date of Patent: Jan. 6, 2015

(54) METADATA TRANSMISSION APPARATUS, METADATA RECEPTION APPARATUS, IMAGING APPARATUS, AND INFORMATION MANAGEMENT PROGRAM

(75) Inventor: Norio Kobota, Kanagawa (JP)

(73) Assignee: Sony Corporation (JP)

( * ) Notice: Subject to any disclaimer, the term of this patent is extended or adjusted under 35 U.S.C. 154(b) by 1103 days.

(21) Appl. No.: 12/380,831

(22) Filed: Mar. 4, 2009

(65) Prior Publication Data

US 2009/0225229 A1 Sep. 10, 2009

(30) Foreign Application Priority Data

Mar. 6, 2008 (JP) ................................ P2008-055951

(51) Int. Cl.
*H04N 7/18* (2006.01)
*G06F 17/30* (2006.01)

(52) U.S. Cl.
CPC .............................. *G06F 17/30265* (2013.01)
USPC ........................................................ 725/81

(58) Field of Classification Search
CPC ................... H04N 21/4223; H04N 21/23109; H04N 21/278; H04N 21/84
USPC ..................................................... 725/73, 81
See application file for complete search history.

(56) References Cited

U.S. PATENT DOCUMENTS

| | | | |
|---|---|---|---|
| 2004/0022444 A1* | 2/2004 | Rhoads | 382/232 |
| 2004/0126038 A1* | 7/2004 | Aublant et al. | 382/305 |
| 2005/0018057 A1* | 1/2005 | Bronstein et al. | 348/239 |
| 2007/0054615 A1* | 3/2007 | Marshall et al. | 455/3.06 |
| 2007/0291323 A1* | 12/2007 | Roncal | 358/402 |
| 2009/0009626 A1* | 1/2009 | Ko et al. | 348/231.3 |
| 2009/0102859 A1* | 4/2009 | Athsani et al. | 345/619 |
| 2011/0138478 A1* | 6/2011 | Kaarela et al. | 726/27 |
| 2014/0153721 A1* | 6/2014 | Malone et al. | 380/259 |

FOREIGN PATENT DOCUMENTS

| | | |
|---|---|---|
| JP | 4-070735 A | 3/1992 |
| JP | 2003018518 A | 1/2003 |
| JP | 2003-134454 A | 5/2003 |
| JP | 2006-254234 A | 9/2006 |
| JP | 2007-287030 A | 11/2007 |

OTHER PUBLICATIONS

Office Action from Japanese Application No. 2008-055951, dated Feb. 23, 2010.

* cited by examiner

*Primary Examiner* — Junior Mendoza
(74) *Attorney, Agent, or Firm* — Lerner, David, Littenberg, Krumholz & Mentlik, LLP (57) ABSTRACT

Disclosed herein is a metadata transmission apparatus including a storage section configured to store metadata, and a wireless transmission section configured to transmit the metadata stored in the storage section via a wireless communication network.

11 Claims, 6 Drawing Sheets

FIG.6

# METADATA TRANSMISSION APPARATUS, METADATA RECEPTION APPARATUS, IMAGING APPARATUS, AND INFORMATION MANAGEMENT PROGRAM

CROSS REFERENCES TO RELATED APPLICATIONS

The present application claims priority from Japanese Patent Application No. JP 2008-055951, filed in the Japanese Patent Office on Mar. 6, 2008, the entire content of which is incorporated herein by reference.

BACKGROUND OF THE INVENTION

1. Field of the Invention

The present invention relates to a metadata transmission apparatus that distributes metadata via a wireless communication network, a metadata reception apparatus that receives the metadata and associates the metadata with information, an imaging apparatus, and an information management program.

2. Description of the Related Art

There are network spaces, typified by video hosting services, for sharing video contents such as home videos with other people on the Internet today. In such services, an enormous number of video contents uploaded by a large number of users are stored in a server, and upon a request from a user, a video content desired by the user is searched for, and a retrieved video content is distributed to the requester via a network.

In order to facilitate retrieval of a desired content from among the enormous number of contents, it is necessary to add a classification or information serving as a search key to each of the contents, and manage the contents so that the content can be retrieved not only based on a title of the content but also based on the classification or search key of the content (see Japanese Patent Laid-open No. 2007-287030, for example).

SUMMARY OF THE INVENTION

Here, only methods available for grouping contents that are closely related to one another among the large number of contents stored in the server are those that use title information or tags that are entered by creators or posters of the contents. Since the title information or tags assigned to the contents are arbitrarily set by the creators or posters of the contents, it is difficult to set the same tag or title information for all contents that are closely related to one another. As described above, since the setting of the tags or the title information is not consistent, it is difficult to retrieve genuinely related contents with great precision.

The present invention addresses the above-identified, and other problems associated with methods and apparatuses in the past, and seeks to improve the precision with which closely related information is retrieved, by providing an apparatus and program that are capable of assigning common metadata to pieces of information that are closely related to one another.

According to one embodiment of the present invention, there is provided a metadata transmission apparatus including: a storage section configured to store metadata; and a wireless transmission section configured to transmit the metadata stored in the storage section via a wireless communication network. Use of this metadata transmission apparatus makes it possible for devices placed within a range of the wireless communication network to receive and share the same metadata.

Here, the metadata refers to attached information that is associated with prescribed information. Examples of the metadata include identification information, a title, a classification, a time, and a place. The metadata can be used for management, search, and so on. The metadata may have a data structure based on identification information.

A protocol that allows communication within a range of hundreds of meters may be used for the wireless communication network. Direct communication between the metadata transmission apparatus and the wireless communication network without the need for special network settings (e.g., an ad hoc mode of ZigBee, Bluetooth, or the like) is preferable.

Also, the metadata may include a distributor certificate of the metadata. This will make it possible to place a restriction on use of the received metadata, for example, by preventing the use of the metadata without key information that matches the distributor certificate.

According to another embodiment of the present invention, there is provided a metadata reception apparatus including: a wireless reception section configured to receive metadata transmitted via a wireless communication network; and a storage section configured to store the metadata received by the wireless reception section so as to be associated with information captured in an area where the metadata has been received.

In this embodiment of the present invention, the metadata is stored so as to be associated with the information captured in the area where the metadata has been received, and therefore, pieces of information that are captured in the area where the reception of the metadata is possible can be stored so as to be associated with the same metadata.

In the case where the received metadata includes a distributor certificate of the metadata, the metadata reception apparatus according to this embodiment of the present invention may prevent use of the metadata without key information that matches the distributor certificate.

According to yet another embodiment of the present invention, there is provided an imaging apparatus including: an information acquisition section configured to capture information composed of one or both of a video and an audio; a wireless reception section configured to receive metadata transmitted via a wireless communication network; and a storage section configured to store the information captured by the information acquisition section in an area where the wireless reception section is capable of receiving the metadata, such that the information is associated with the metadata.

According to this embodiment of the present invention, in the case where information composed of a video or an audio or both of them is captured in an area where the metadata is distributed, the captured information can be stored so as to be associated with the received metadata. Thus, pieces of information, such as videos or audios, that are captured in the area where the metadata is distributed can be stored so as to be associated with the same metadata.

According to yet another embodiment of the present invention, there is provided an information management program for causing a computer to execute the steps of: receiving information captured by an imaging apparatus and metadata that is associated with the information; and displaying association between the information and the metadata. This information management program allows a user to refer to the information captured by the imaging apparatus and the metadata associated with the information easily.

The information management program according to this embodiment of the present invention may cause the computer to execute a further step of transmitting the metadata associated with the information to a server together with the information. In this case, the information management program allows easy upload of the information captured by the imaging apparatus and the metadata associated with this information to the server.

The present invention makes it possible to assign common metadata to pieces of information that are closely related to one another, and to improve the precision with which closely related information is retrieved.

DETAILED DESCRIPTION OF THE PREFERRED EMBODIMENTS

Hereinafter, a preferred embodiment of the present invention will be described with reference to the accompanying drawings according to the embodiment of the present invention. It is assumed in this embodiment that video contents are used as information, in order to facilitate the explanation.

<Structure of Metadata Transmission Apparatus and Metadata Reception Apparatus>

Figure 1:
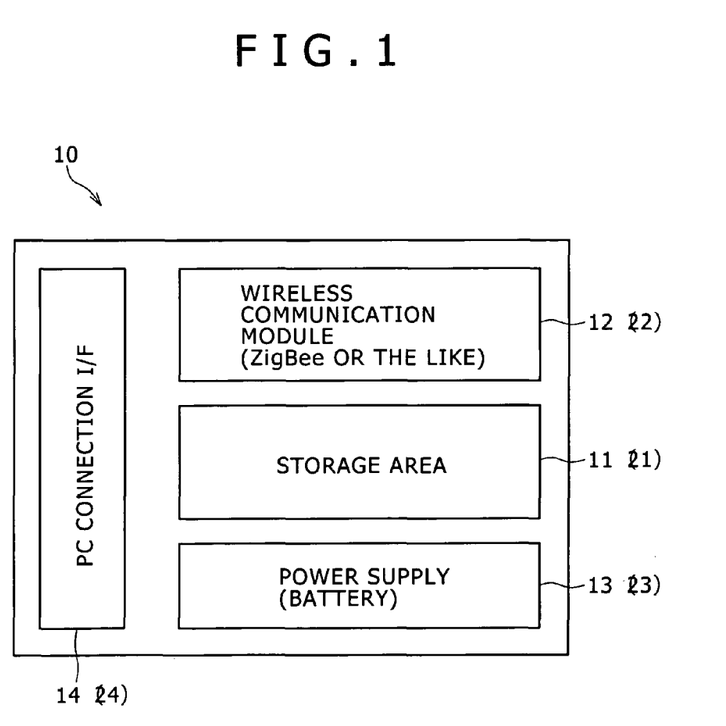
FIG. 1 is a block diagram illustrating the structure of a metadata transmission apparatus and metadata reception apparatus according to an embodiment of the present invention.

FIG. 1 is a block diagram illustrating the structure of a metadata transmission apparatus and metadata reception apparatus. The metadata transmission apparatus and the metadata reception apparatus have the same basic structure. Therefore, the same figure is used for explanations of both the metadata transmission apparatus and the metadata reception apparatus. Each of the metadata transmission apparatus and the metadata reception apparatus may fulfill functions of both of them, or alternatively may fulfill only the function of either transmission or reception. In the following description, for the sake of convenience, the metadata transmission apparatus and the metadata reception apparatus are assigned reference numerals 10 and 20, respectively, and thus differentiated from each other. In the following description, reference numerals within parentheses refer to components of the metadata reception apparatus 20.

As illustrated in FIG. 1, the metadata transmission apparatus 10 (the metadata reception apparatus 20) includes a storage area 11 (21) and a wireless communication module 12 (22). As necessary, the metadata transmission apparatus 10 (the metadata reception apparatus 20) additionally includes a power supply 13 (23), such as a battery, and a PC connection I/F (interface) 14 (24) for exchanging information with a personal computer (hereinafter simply referred to as a "PC").

In the metadata transmission apparatus 10, metadata that is to be distributed is stored in the storage area 11 beforehand. The wireless communication module 12 performs a process of transmitting the metadata stored in the storage area 11 via a wireless communication network.

As the storage area 11 in the metadata transmission apparatus 10, a rewritable non-volatile memory or a hard disk drive is used. Note that the storage area 11 may be contained in a housing of the metadata transmission apparatus 10, or externally connected to the metadata transmission apparatus 10, or connected to the metadata transmission apparatus 10 via a network.

The wireless communication module 12 in the metadata transmission apparatus 10 supports short range communication in the wireless communication network. Here, the term "short range" encompasses the range of several centimeters, the range of several meters, the range of tens of meters, the range of hundreds of meters, and the range of several kilometers. Preferably, the wireless communication module 12 performs communication using a protocol that allows communication within the range of hundreds of meters. In particular, preferably, the wireless communication module 12 allows direct communication between the metadata transmission apparatus 10 and the metadata reception apparatus 20 without the need for special network settings. For example, a module that can be used in an ad hoc mode, such as a ZigBee or Bluetooth module, is used therefor.

An example of the power supply 13 is a storage battery contained in the housing of the metadata transmission apparatus 10. Alternatively, the power supply 13 may receive supply of power from an outside. The PC connection I/F 14 uses a standard (e.g., USB: Universal Serial Bus) that allows connection with the PC, and exchanges data with a setting application executed on the PC.

The setting application executed on the PC is capable of managing the metadata stored in the storage area 11. For example, the setting application is capable of reading the metadata stored in the storage area 11 and displaying it on a monitor, allowing metadata entered by a user to be stored in the storage area 11, or deleting or copying the metadata stored therein.

Note that a setting application that is executed within the metadata transmission apparatus 10 may be used, and that the management of the metadata may be carried out through a touch panel display (not shown). In this case, the management of the metadata is carried out without the use of the PC connection I/F 14.

In the metadata reception apparatus 20, the wireless communication module 22 receives the metadata transmitted from the wireless communication module 12 in the metadata transmission apparatus 10 via the wireless communication network, and the metadata reception apparatus 20 performs a process of storing the received metadata in the storage area 21 so as to be associated with information that has been captured in an area where the metadata has been received.

As the storage area 21 in the metadata reception apparatus 20, a rewritable non-volatile memory or a hard disk drive is used. Note that the storage area 21 may be contained in a housing of the metadata reception apparatus 20, or externally connected to the metadata reception apparatus 20, or connected to the metadata reception apparatus 20 via a network.

The storage area 21 is an area in which the received metadata is stored so as to be associated with the captured information, and does not necessarily need to store the captured information. In the case where the captured information is stored in another storage area, the storage area 21 stores the metadata and information about an association between the metadata and the captured information, such as an address of a storage location of the captured information.

The wireless communication module 22 in the metadata reception apparatus 20 supports short range communication in the wireless communication network. Here, the term "short range" encompasses the range of several centimeters, the range of several meters, the range of tens of meters, the range of hundreds of meters, and the range of several kilometers. Preferably, the wireless communication module 22 performs communication using a protocol that allows communication within the range of hundreds of meters. In particular, preferably, the wireless communication module 22 allows the direct communication between the metadata transmission apparatus 10 and the metadata reception apparatus 20 without the need for special network settings. For example, a module that can be used in the ad hoc mode, such as a ZigBee or Bluetooth module, is used therefor.

An example of the power supply 23 is a storage battery contained in the housing of the metadata reception apparatus 20. Alternatively, the power supply 23 may receive supply of power from an outside. The PC connection I/F 24 uses a standard (e.g., USB: Universal Serial Bus) that allows connection with a PC, and exchanges data with an information management application executed on the PC.

The information management application executed on the PC is capable of managing the information and the metadata stored in the storage area 21. For example, the information management application is capable of reading the information and the metadata stored in the storage area 21 into the PC and associating the information with the metadata for management, displaying a state of the association between the information and the metadata, or transmitting (uploading) the information and the metadata associated with the information to an external server via the network.

Note that an information management application that is executed within the metadata reception apparatus 20 or a device (e.g., an imaging apparatus) in which the metadata reception apparatus 20 is installed may be used, and that the management of the information and the metadata may be carried out through a touch panel display (not shown). In this case, the management of the metadata is carried out without the use of the PC connection I/F 24.

The metadata reception apparatus 20 according to the present embodiment is installed in an imaging apparatus or is connectable to the imaging apparatus as an extension, for example. The imaging apparatus includes an imaging section for capturing one of both of a video and an audio, and a storage area for storing the captured video and/or audio. The storage area 21 in the metadata reception apparatus 20 may be an independent storage area 21 for storing the metadata, or may be a part of an area for storing the information, such as the video or the audio, captured by the imaging apparatus.

Figure 2:
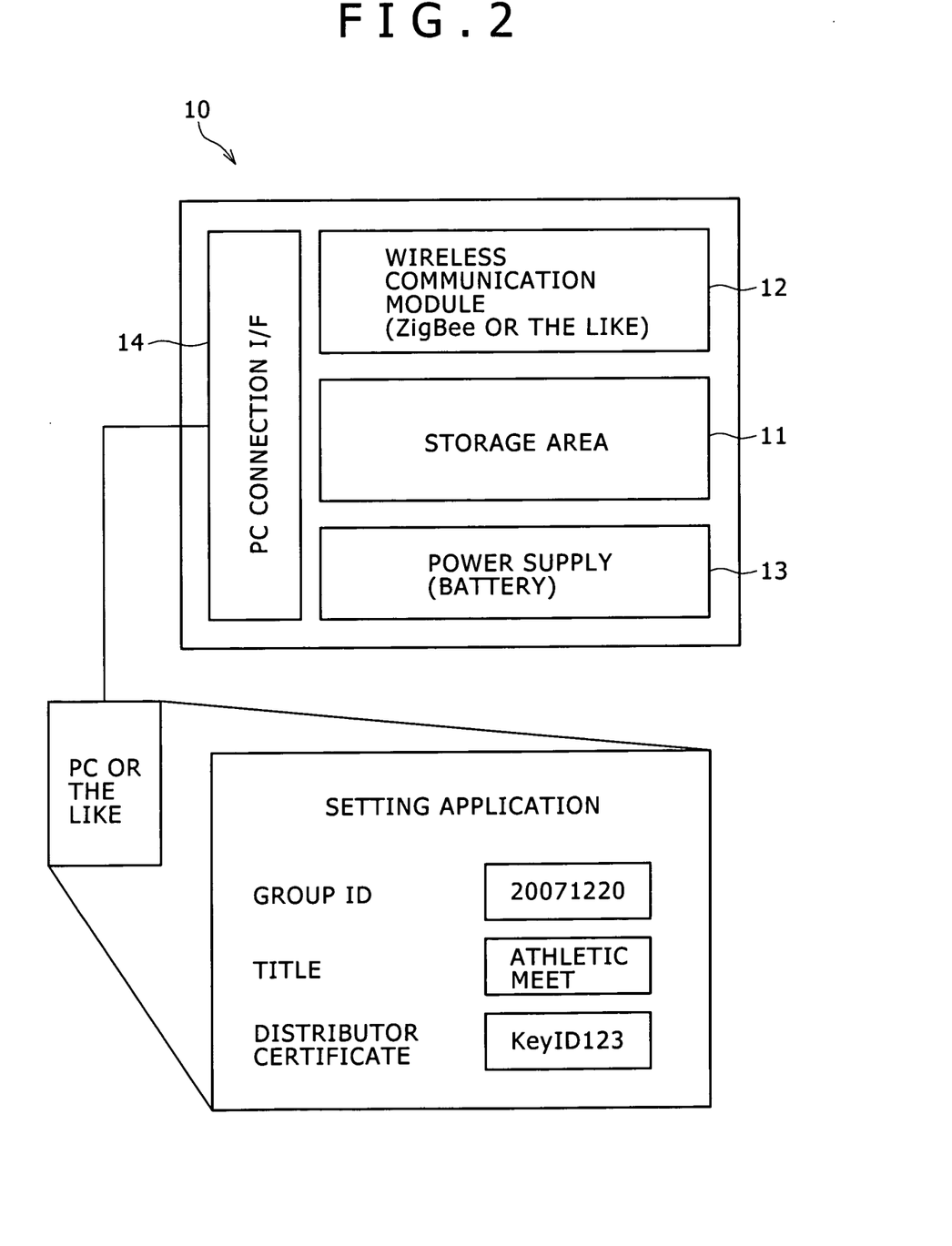
FIG. 2 illustrates a manner in which the metadata transmission apparatus registers and transmits metadata.

FIG. 2 illustrates a manner in which the metadata transmission apparatus registers and transmits the metadata. Here, an exemplary case will be described where the PC is connected to the PC connection I/F 14 and the setting application (program) is executed on the PC to register the metadata. Note, however, that the following description also applies to the case where the setting application is executed in the metadata transmission apparatus 10, without the aid of the PC, to register the metadata.

Before the transmission of the metadata by the metadata transmission apparatus 10, the metadata that is to be transmitted is registered (stored) in the storage area 11. If the PC is connected to the PC connection I/F 14 and the setting application is executed thereon, a screen is displayed that allows entry of items for the metadata to be registered.

Here, the metadata has a data structure that is managed in a unified manner based on a group ID, which is identification information. Therefore, the group ID is set (or generated automatically) first, and then necessary items are entered. In the example as illustrated in FIG. 2, an item for a title is prepared, and information that forms a component of the metadata, e.g., "Athletic Meet," is entered there.

Other examples of the components of the metadata include a classification (a class, such as sports, drama, cultural festival, or sightseeing), a place (a facility name, an address, a zip code, or GPS latitude/longitude information), a time, and various other types of information (weather information, a telephone number, a Web address, an electronic mail address, etc.). The screen displayed may be configured to allow entry of such information.

Moreover, the metadata may include a distributor certificate of the metadata. The distributor certificate is used by a distributor that transmits (distributes) the metadata in order to restrict users of the metadata so that the use of the metadata is permitted to only particular users. Each distributor certificate has corresponding key information. A receiver of the metadata cannot use the received metadata without authentication using the key information corresponding to the distributor certificate. Certificate identification information or the corresponding key information may be used as the distributor certificate. In the example as illustrated in FIG. 2, the key information is registered.

A user registers the metadata using the setting application, and sends the metadata to the metadata transmission apparatus 10, so that the registered metadata is stored in the storage area 11. The setting application is also capable of general management of the metadata. For example, the setting application is capable of reading the metadata already set in the storage area 11 and displaying the read metadata on the monitor, allowing the user to modify a component of the metadata while referring to the displayed metadata, preparing a plurality of types of information about each component of the metadata for the group ID, or calling prepared metadata upon entry of the group ID.

The metadata transmission apparatus 10, in a situation where the metadata that is to be transmitted is stored in the storage area 11, transmits the metadata to the wireless communication network via the wireless communication module 12. The metadata is broadcast by the wireless communication network within a predetermined range.

Figure 3:
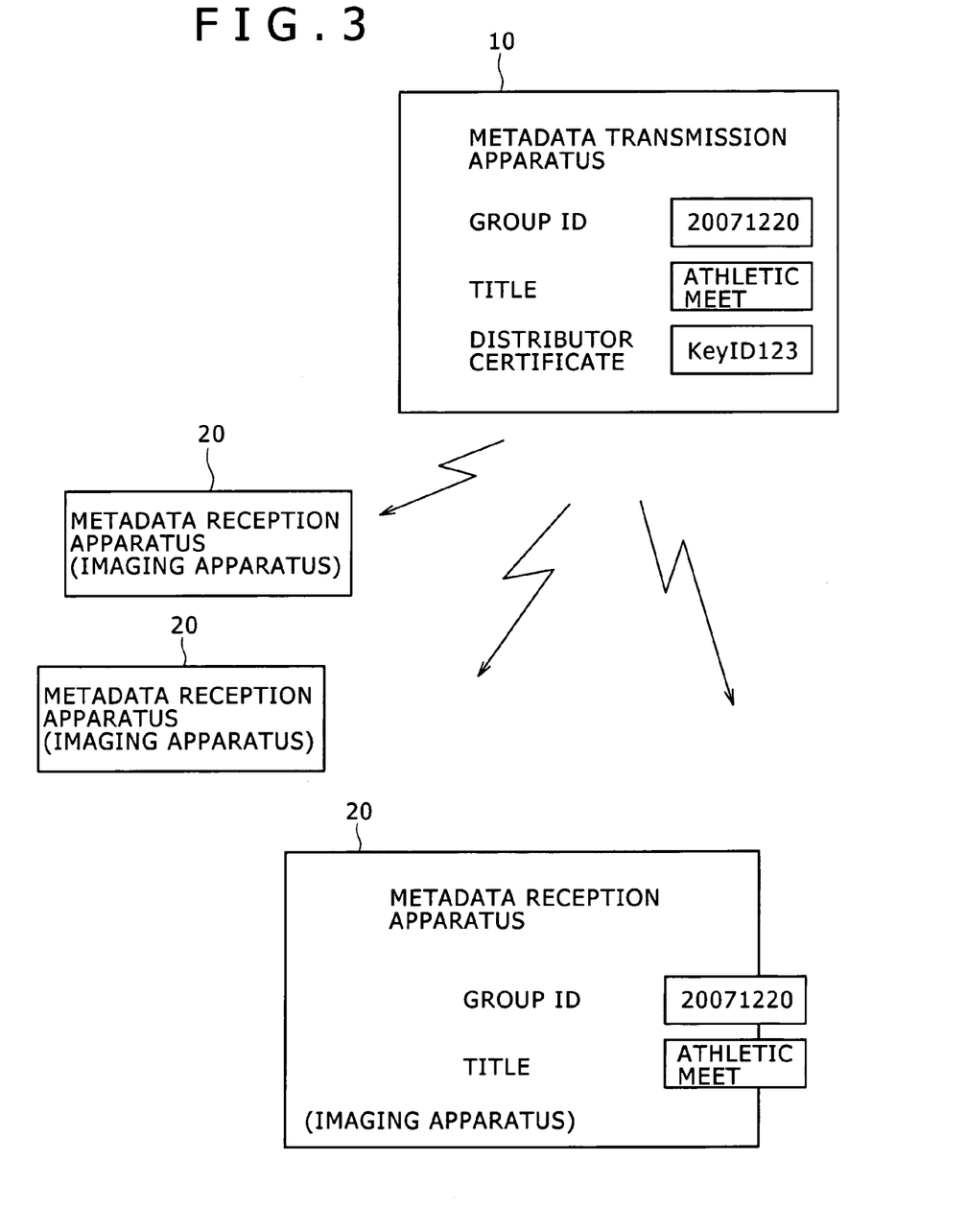
FIG. 3 illustrates how the metadata distributed is received by metadata reception apparatuses.

FIG. 3 illustrates how the metadata distributed is received by metadata reception apparatuses. As described above, the metadata is transmitted from the metadata transmission apparatus 10 and distributed by the wireless communication network within the predetermined range. Metadata reception apparatuses 20 that are placed in an area where this metadata is distributed are capable of receiving the metadata distributed.

In the case where there are a plurality of metadata reception apparatuses 20 in the same area, all of them are capable of receiving the same metadata. Since the metadata has the data structure that is managed in a unified manner based on the group ID, which is the identification information, the metadata reception apparatus 20 receives components of the data structure corresponding to this group ID.

The example of FIG. 3 illustrates a situation in which a plurality of imaging apparatuses having the function of the metadata reception apparatus 20 are placed in a certain area. Each of the imaging apparatuses is capable of receiving the same metadata distributed from the metadata transmission apparatus 10, and storing the received metadata so as to be associated with information, such as the video and/or the audio, captured in the area where the reception of the metadata is possible.

Accordingly, even though each of the imaging apparatuses captures a different piece of information such as a different video and/or audio, the same metadata is assigned to the different pieces of information, since they have been captured in the area where the reception of the same metadata is possible. Pieces of information that are captured in an area where the reception of the same metadata is possible are generally closely related to one another, even if those pieces of information are information such as videos taken from different angles. Thus, if those pieces of information are assigned the same metadata and thus managed, the precision in subsequent information search will improve.

In FIG. 3, the metadata transmission apparatus 10 distributes the metadata, with a site of an athletic meet as the area where the reception of the metadata is possible. The imaging apparatuses that shoot videos at the site of the athletic meet receive the same metadata, with the same group ID and the same title "Athletic Meet." Accordingly, even though each of the imaging apparatuses shoots a different video, all the videos shot by the imaging apparatuses are associated with the same metadata, as they are shot in the same site of the athletic meet. In the case where these videos are registered in a database server or a server for a video hosting service, the videos will be grouped and searched for appropriately, with the same metadata for a search key.

As another exemplary application, when a sport game (e.g., a soccer game) is broadcast, for example, this same game may be shot by a plurality of cameras. In that case, in a stadium where the game is held, the metadata transmission apparatus 10 transmits the metadata, while the metadata reception apparatus 20, provided in each of the cameras, receives the metadata. Each camera associates the received metadata with a video shot by the camera, and, after the end of the shooting, registers the video shot by the camera in a library along with the metadata. Thus, the videos of the same game as shot by the different cameras are associated with the same metadata, and therefore the user is able to acquire the video of the same game as captured by each camera appropriately by searching the library using that metadata.

In the case where the metadata transmitted from the metadata transmission apparatus 10 includes the distributor certificate, even if the metadata reception apparatus 20 receives that metadata, the metadata reception apparatus 20 cannot use the metadata without input of the key information corresponding to the distributor certificate. Therefore, even when there are multiple metadata reception apparatuses 20 in the same area where the reception of the metadata is possible, only the user of the metadata reception apparatus 20 who is informed of the key information beforehand is able to use the metadata. Thus, restriction of users of the metadata is possible on the part of the transmitter of the metadata.

Meanwhile, in the case where the metadata does not include the distributor certificate, all users who have received the metadata are able to use the metadata. It is also possible to restrict the range of metadata which the user is permitted to use, by means of key information set for the distributor certificate. For example, by using certain key information, it is possible to permit the use of only some parts of the received metadata.

Figure 4:
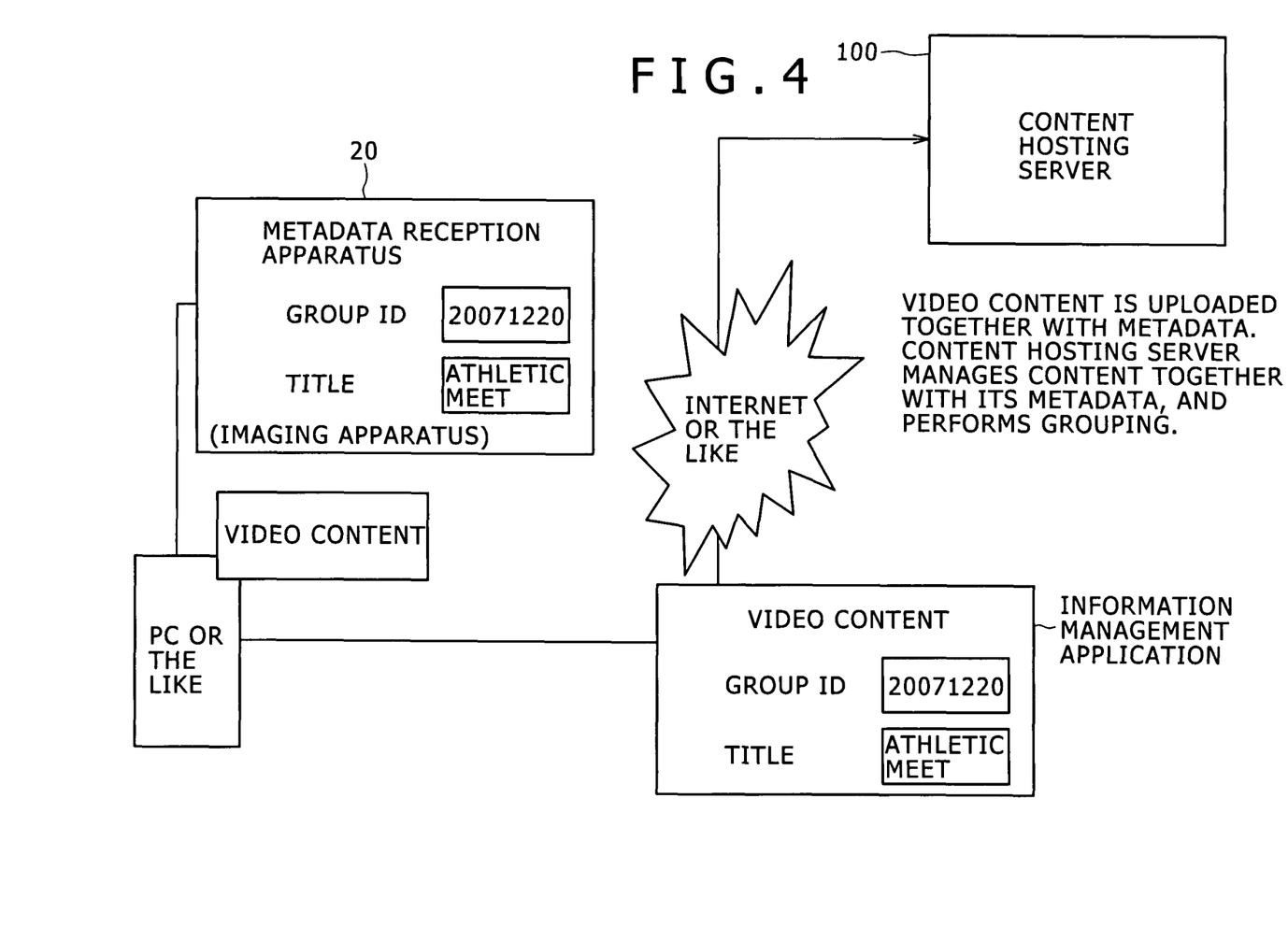
FIG. 4 illustrates upload of a video content captured by an imaging apparatus having a function of the metadata reception apparatus to a server.

FIG. 4 illustrates upload of a video content captured by an imaging apparatus having the function of the metadata reception apparatus to the server. FIG. 4 illustrates an exemplary case where the PC is connected to the PC connection I/F of the metadata reception apparatus 20, and the information management application (program) executed on the PC is used to upload the video content to the server. Note, however, that the following description also applies to the case where the information management application executed in the metadata reception apparatus (the imaging apparatus) 20 is used, without the aid of the PC, to upload the video content to the server.

The information management application is executed on the PC, which is connected to the metadata reception apparatus (imaging apparatus) 20, and the information, such as the video, captured by the metadata reception apparatus (imaging apparatus) 20 and the metadata associated with this information are read into the PC. Then, a display is presented on the monitor or the like that indicates the association between the read information (e.g., the video content) and the metadata, while the read information and the metadata are associated with each other.

The user refers to this display, and is able to perform a process of causing the information (e.g., the video content) to be stored in a storage medium connected to the PC so as to be associated with the metadata, or perform a process of uploading the information and the associated metadata to a content hosting server 100 via a network such as the Internet, for example.

The content hosting server 100 manages the uploaded video content and metadata while associating them with each other, and uses them for grouping, searching, and so on. In the present embodiment, because the same metadata is assigned to video contents that are closely related to one another, the grouping and searching are possible in the content hosting server 100 with high precision.

Figure 5:
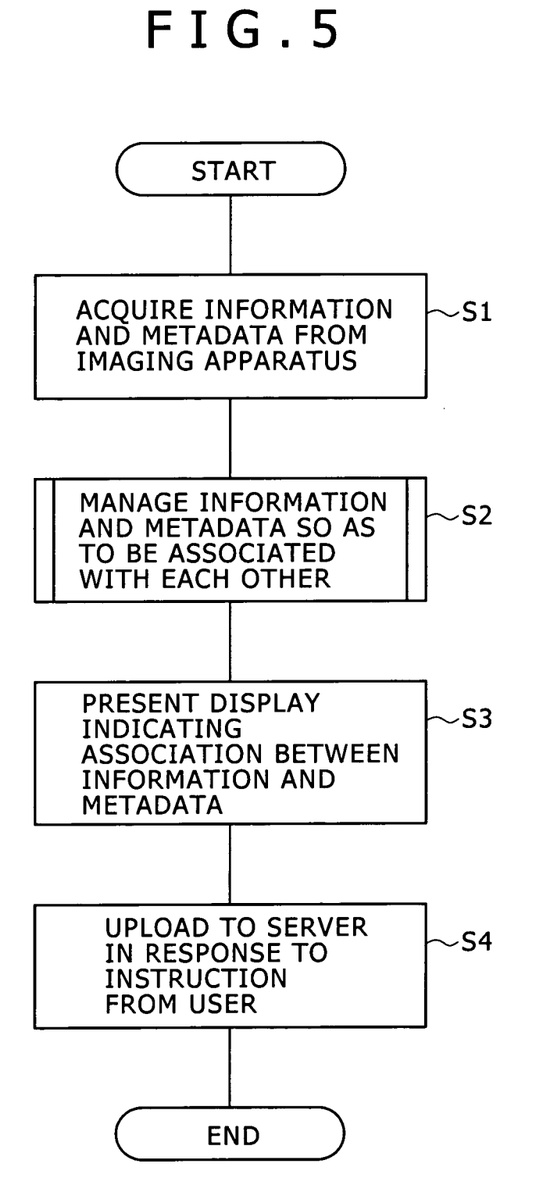
FIG. 5 is a flowchart illustrating a flow of processes performed by an information management application (program)

FIG. 5 is a flowchart illustrating a flow of processes performed by the information management application (program). Each step in this flowchart is executed by a computer (e.g., the PC or the metadata reception apparatus as the computer).

First, the information, such as the video content, and the corresponding metadata are acquired from the imaging apparatus having the function of the metadata reception apparatus (step S1). Next, the information and the metadata acquired are managed so as to be associated with each other (step S2). Thereafter, the display indicating the association between the information and the metadata is presented (step S3), and in response to an instruction from the user, the video and the metadata are uploaded to the server, such as the content hosting server (step S4).

Figure 6:
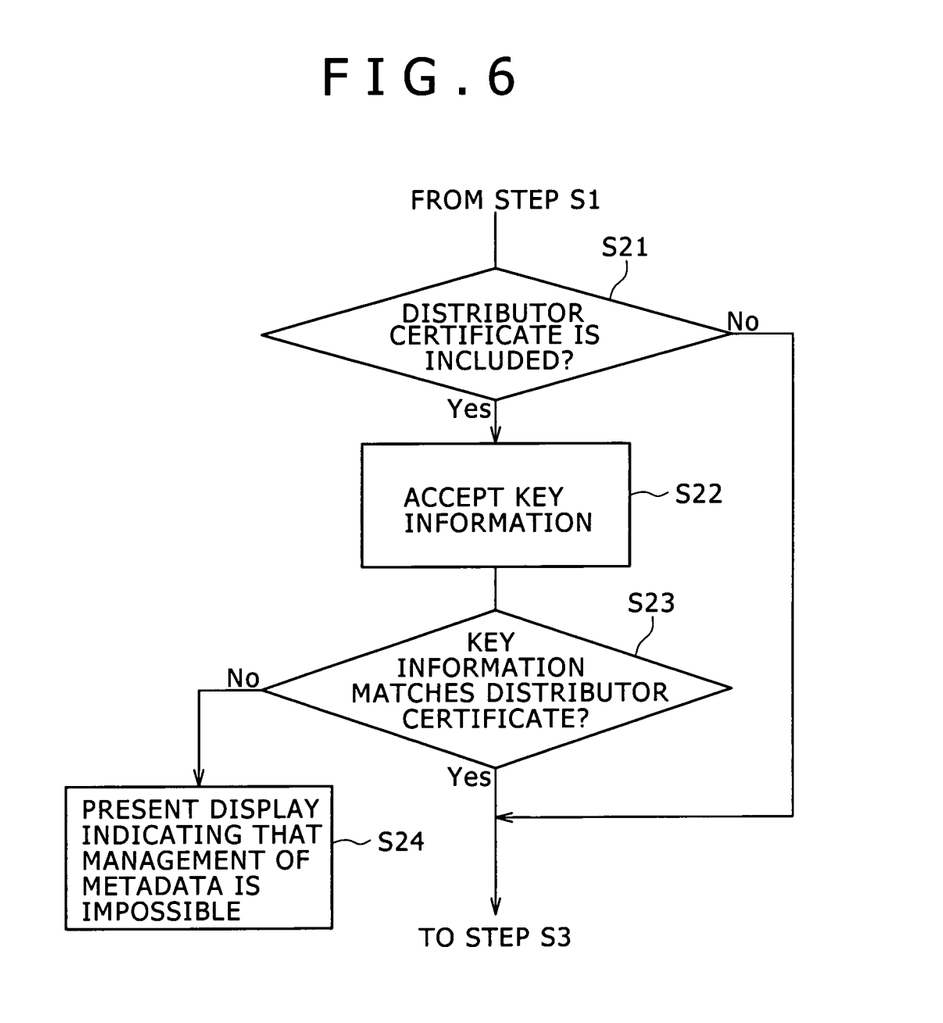
FIG. 6 is a flowchart illustrating a procedure (subroutine) that is performed in the case where the metadata includes a distributor certificate.

Note here that the metadata received at step S1 may include the distributor certificate. In this case, a procedure (a subroutine) as illustrated in FIG. 6 is performed when managing the information and the metadata so as to be associated with each other (step S2). That is, it is determined whether or not the metadata received at step S1 includes the distributor certificate (step S21). If it is determined at step S21 that the metadata received at step S1 does not include the distributor certificate, control proceeds to step S3, because the use of the metadata is possible as it is.

Meanwhile, if it is determined at step S21 that the metadata includes the distributor certificate, the user is prompted to enter the key information. For example, a display that prompts the user to enter the key information is presented on the monitor, and a screen for accepting the entry of the key information is displayed (step S22).

Then, it is determined whether or not the key information accepted from the user matches the distributor certificate (step S23). If it is determined at step S23 that the key information matches the distributor certificate, it is determined that the use of the metadata is permitted, and control proceeds to step S3. Meanwhile, if it is determined at step S23 that the key information does not match the distributor certificate, a display that indicates that the use of the metadata is not permitted is presented (step S24).

In the process of restricting the use of the metadata depending on whether the key information matches the distributor certificate included in the metadata, restriction on the use of components of the metadata may be placed differently depending on the type of the key information. Specifically, it may be so arranged that a plurality of types of key information are set for the same distributor certificate, and that one type of key information enables use of all components of the metadata, while another type of key information enables use of only a particular component of the metadata. The restriction may be placed differently in such a manner.

The information management application as described above may be stored in a given storage medium or may be delivered via the network to be executed by the computer.

As described above, in a space where the video content or the like is generated, the metadata, such as the group ID or a character string, is broadcast using the wireless communication network, and the metadata received is stored so as to be associated with the video content or the like. If, when such video contents or the like are to be shared among different users, the metadata for each of the video contents is recorded as information that accompanies the corresponding video content, common accompanying information will be recorded for contents that are closely related to one another, which allows high-precision management when performing processes such as the grouping and searching.

While the present embodiment primarily refers to the case where the video contents are generated, the present invention is also applicable to cases where, when audio contents or some other types of information (e.g., weather information, such as temperature, humidity, atmospheric pressure, wind velocity, precipitation, or pollen count information, or physical quantity information, such as a distance over which an object has traveled, the speed of an object, or an electromagnetic wave intensity of a space) captured in an area (reception area) where the reception of the metadata is possible are acquired, the metadata distributed in that area (reception area) is received and used for the association with the information.

While the metadata transmission apparatus 10 and the metadata reception apparatus 20 are separate devices in the present embodiment, a metadata transmission/reception apparatus that has functions of both the metadata transmission apparatus 10 and the metadata reception apparatus 20 may be applied to the imaging apparatus or the like, in another embodiment of the present invention. In this case, for example, the metadata registered in such a metadata transmission/reception apparatus applied to one imaging apparatus is transmitted, and this metadata is received by another imaging apparatus for using it. Such transmission and reception of the metadata between different imaging apparatuses is possible.

Further, in the case where a plurality of devices, such as imaging apparatuses, that have the function of the metadata transmission/reception apparatus are placed in an area where information exchange is possible therebetween, each of the devices may transmit and receive the metadata to and from the other device(s), merge (combine) components of the plurality of pieces of metadata exchanged therebetween, so that all the devices can share the same metadata.

For example, suppose that three devices, device A, device B, and device C, are placed in an area where the information exchange is possible therebetween, and that metadata a, metadata b, and metadata c are registered in device A, device B, and device C, respectively. In this case, device A, device B, and device C transmit metadata a, metadata b, and metadata c registered therein, respectively, receive the pieces of metadata b and c, c and a, and a and b transmitted from the other devices B and C, C and A, and A and B, respectively, and merge the pieces of metadata.

More specifically, device A transmits metadata a, which is registered therein, receives the pieces of metadata b and c, which are transmitted from devices B and C, respectively, and merges the pieces of metadata b and c with metadata a registered therein. As a result, the pieces of metadata a, b, and c are registered in device A.

Similarly, device B transmits metadata b, which is registered therein, receives the pieces of metadata a and c, which are transmitted from devices A and C, respectively, and merges the pieces of metadata a and c with metadata b. As a result, the pieces of metadata a, b, and c are registered in device B.

Similarly, device C transmits metadata c, which is registered therein, receives the pieces of metadata a and b, which are transmitted from devices A and B, respectively, and merges the pieces of metadata a and b with metadata c registered therein. As a result, the pieces of metadata a, b, and c are registered in device C.

As described above, when each of the devices placed in the area where the information exchange is possible therebetween transmits and receives the metadata to and from the other devices, all the devices in the area can share the same metadata.

Suppose that there are a plurality of devices that have the function of the metadata transmission/reception apparatus, and that some of the devices, i.e., child devices, are capable of communicating with only a particular one of the devices, i.e., a parent device. In this case, metadata registered in each of the child devices is once transmitted to the particular device (i.e., the parent device), and the pieces of metadata transmitted from the respective child devices are merged together in the particular device (i.e., the parent device), and thereafter the resulting metadata is broadcast to and received by each of the child devices. As a result, each of the child devices is able to share the same metadata which is obtained by the particular device (i.e., the parent device) merging the pieces of metadata registered in the respective child devices.

It should be understood by those skilled in the art that various modifications, combinations, sub-combinations and alterations may occur depending on design requirements and other factors insofar as they are within the scope of the appended claims or the equivalents thereof.

What is claimed is:

1. A metadata transmission apparatus, comprising:
a storage section configured to store metadata associated with information captured in a predetermined area where reception of the metadata is possible, wherein the metadata is associated with a situation or information related to an event in the predetermined area at a predetermined time; and
a wireless transmission section configured to transmit the metadata stored in said storage section via a wireless communication network allowing communication within a predetermined range such that the metadata is receivable in the predetermined area,
wherein the metadata can be distributed to a plurality of receiving apparatuses in the predetermined area and is used so that, when the receiving apparatuses generate within the predetermined area one or more contents at the predetermined time of the situation or the event, the received metadata is stored as data associated with each of the contents indicating that the each of the contents is associated with the situation or the event in the predetermined area, wherein the metadata stored in said storage section includes a distributor certificate of the metadata and prescribed information with a data structure based on identification information, in which the distributor certificate is related to key information, and wherein the metadata is transmitted to a server; and wherein a display is presented that prompts acceptance of matching key information that matches the distributor certificate, and, only when the matching key information that matches the distributor certificate has been accepted, the association between the content and the metadata is displayed.

2. The metadata transmission apparatus according to claim 1, wherein said wireless transmission section uses a protocol that allows communication within a range of hundreds of meters for the wireless communication network.

3. A metadata reception apparatus, comprising:
a content generation section configured to generate one or more contents;
a wireless reception section configured to receive metadata associated with information captured in a predetermined area where reception of the metadata is possible, wherein the metadata is transmitted via a wireless communication network allowing communication within a predetermined range such that the metadata is receivable in the predetermined area, wherein the metadata is associated with a situation or information related to an event in the predetermined area at a predetermined time, wherein the metadata includes a distributor certificate of the metadata and prescribed information with a data structure based on identification information, in which the distributor certificate is related to key information, and wherein the metadata is transmitted to a server; and
a storage section configured to store the metadata received by said wireless reception section as data associated with each of contents generated within the predetermined area at the predetermined time of the situation or the event by the content generation section indicating that the each of contents is associated with the situation or the event in the predetermined area,
wherein the metadata can be distributed to other receiving apparatus in the predetermined area; and
wherein a display is presented that prompts acceptance of matching key information that matches the distributor certificate, and, only when the matching key information that matches the distributor certificate has been accepted, the association between the content and the metadata is displayed.

4. The metadata reception apparatus according to claim 3, wherein said storage section stores the metadata only when matching key information that matches the distributor certificate has been accepted from a user.

5. The metadata reception apparatus according to claim 3, wherein said storage section stores the prescribed information included in the metadata received by said wireless reception section in accordance with the data structure based on the identification information.

6. An imaging apparatus, comprising:
an information acquisition section configured to capture information composed of one or both of a video and an audio;
a wireless reception section configured to receive metadata associated with information captured in a predetermined area where said wireless reception section is capable of receiving the metadata, wherein the metadata is transmitted via a wireless communication network allowing communication within a predetermined range such that the metadata is receivable in the predetermined area, wherein the metadata is associated with a situation or information related to an event in the predetermined area at a predetermined time, wherein the metadata includes a distributor certificate of the metadata and prescribed information with a data structure based on identification information, in which the distributor certificate is related to key information, and wherein the metadata is transmitted to a server; and
a storage section configured to store the metadata received by the wireless reception section as data associated with each of the information captured within the predetermined area at the predetermined time of the situation or the event by said information acquisition section indicating that the each of the information captured is associated with the situation or the event in the predetermined area,
wherein the metadata can be distributed to other receiving apparatus in the predetermined area; and
wherein a display is presented that prompts acceptance of matching key information that matches the distributor certificate, and, only when the matching key information that matches the distributor certificate has been accepted, the association between the content and the metadata is displayed.

7. A non-transitory recording medium on which is recorded an information management program for causing a computer to execute the steps of:
receiving, at an apparatus, metadata associated with information captured in a predetermined area where reception of the metadata is possible, wherein the metadata is transmitted via a wireless communication network allowing communication within a predetermined range such that the metadata is receivable in the predetermined area, wherein the metadata is associated with a situation or information related to an event in the predetermined area at a predetermined time, wherein the metadata includes a distributor certificate of the metadata and prescribed information with a data structure based on identification information, in which the distributor certificate is related to key information, and wherein the metadata is transmitted to a server; and
displaying association between content generated within the predetermined area at the apparatus and the metadata, wherein the metadata received is stored as data associated with each of the content generated within the predetermined area at the predetermined time of the situation or the event at the apparatus indicating that the each of the content is associated with the situation or the event in the predetermined area,
wherein the metadata can be distributed to other receiving apparatus in the predetermined area; and
presenting a display that prompts acceptance of matching key information that matches the distributor certificate, and, only when the matching key information that matches the distributor certificate has been accepted, displaying the association between the content and the metadata.

8. The non-transitory recording medium according to claim 7, further comprising the step of: transmitting the metadata to the server together with the content.

9. A metadata transmission apparatus, comprising:
storage means for storing metadata associated with information captured in a predetermined area where reception of the metadata is possible, wherein the metadata is associated with a situation or information related to an event in the predetermined area at a predetermined time; and wireless transmission means for transmitting the metadata stored in said storage means via a wireless communication network allowing communication within a predetermined range such that the metadata is receivable in the predetermined area, wherein the metadata can be distributed to a plurality of receiving apparatuses in the predetermined area and is used so that, when the receiving apparatuses generate within the predetermined area one or more contents at the predetermined time of the situation or the event, the received metadata is stored as data associated with each of the contents indicating that the each of the contents is associated with the situation or the event in the predetermined area, wherein the metadata includes a distributor certificate of the metadata and prescribed information with a data structure based on identification information, in which the distributor certificate is related to key information, and wherein the metadata is transmitted to a server; and wherein a display is presented that prompts acceptance of matching key information that matches the distributor certificate, and, only when the matching key information that matches the distributor certificate has been accepted, the association between the content and the metadata is displayed.

10. A metadata reception apparatus, comprising:

a content generation means configured to generate one or more contents;

wireless reception means for receiving metadata associated with information captured in a predetermined area where reception of the metadata is possible transmitted via a wireless communication network allowing communication within a predetermined range such that the metadata is receivable in the predetermined area, wherein the metadata is associated with a situation or information related to an event in the predetermined area at a predetermined time, wherein the metadata includes a distributor certificate of the metadata and prescribed information with a data structure based on identification information, in which the distributor certificate is related to key information, and wherein the metadata is transmitted to a server; and storage means for storing the metadata received by said wireless reception means as data associated with each of contents generated within the predetermined area at the predetermined time of the situation or the event by the content generation section indicating that the each of contents is associated with the situation or the event in the predetermined area, wherein the metadata can be distributed to other receiving apparatus in the predetermined area; and wherein a display is presented that prompts acceptance of matching key information that matches the distributor certificate, and, only when the matching key information that matches the distributor certificate has been accepted, the association between the content and the metadata is displayed.

11. An imaging apparatus, comprising:

information acquisition means for capturing information composed of one or both of a video and an audio;

wireless reception means for receiving metadata associated with information captured in a predetermined area where said wireless reception means is capable of receiving, the metadata transmitted via a wireless communication network allowing communication within a predetermined range such that the metadata is receivable in the predetermined area, wherein the metadata is associated with a situation or information related to an event in the predetermined area at a predetermined time, wherein the metadata includes a distributor certificate of the metadata and prescribed information with a data structure based on identification information, in which the distributor certificate is related to key information, and wherein the metadata is transmitted to a server; and storage means for storing the metadata received by the wireless reception section as data associated with each of the information captured within the predetermined area at the predetermined time of the situation or the event by said information acquisition means indicating that the each of the information captured is associated with the situation or the event in the predetermined area, wherein the metadata can be distributed to other receiving apparatus in the predetermined area; and presenting wherein a display is presented that prompts acceptance of matching key information that matches the distributor certificate, and, only when the matching key information that matches the distributor certificate has been accepted, the association between the content and the metadata is displayed.

* * * * *